3,145,138
Patented Aug. 18, 1964

3,145,138
METHOD OF KILLING NEMATODES AND FUNGI WITH TRICHLOROACRYLONITRILE
Don R. Baker, Pinole, and Thomas B. Williamson, Santa Clara, Calif., assignors to Stauffer Chemical Company, New York, N.Y., a corporation of Delaware
No Drawing. Filed Jan. 8, 1962, Ser. No. 164,975
2 Claims. (Cl. 167—22)

This invention relates to the novel use of trichloroacrylonitrile as a pesticide.

More particularly, the present invention involves the novel use of trichloroacrylonitrile as a fungicide and a nematocide.

As a composition of matter, trichloroacrylonitrile is known and described in the prior art and its method of preparation is likewise adequately described. However, there is no disclosure of the novel use of the subject compound as described herein.

The following examples clearly show the pesticidal activity of trichloroacrylonitrile.

*Example 1*

Trichloroacrylonitrile was placed in two vials of malt broth at the rate of 50 p.p.m. Next, water suspensions of spores of *Aspergillus niger* and Penicillium sp. were added (one organism per vial). One week later results were noted. *Aspergillus niger* and Penicillium sp. were completely controlled at 50 p.p.m. trichloroacrylonitrile. The tests were re-run on *Aspergillus niger* and Penicillium sp. using lower concentrations of the test compound. Results of these further tests showed that *Aspergillus niger* was completely controlled at 5 p.p.m. trichloroacrylonitrile while Penicillium sp. was partially controlled at 5 p.p.m.

*Example 2*

The compound of the present invention was then tested to see if it possessed a fungicidal vapor phase.

Approximately 0.1 gram of trichloroacrylonitrile was placed in a 0.5 ml. microbeaker in a Petri dish of hardened potato dextrose agar. *Aspergillus niger* spores were dusted onto the agar and the dish was closed. One week later growth of the fungus was recorded as 100% controlled, thus showing the usefulness of trichloroacrylonitrile as a fungicidal fumigant.

*Example 3*

Trichloroacrylonitrile at the rate of 25 p.p.m. was pipetted into root-knot nematode infested soil, was mixed, and then dumped into a paper container. The treated and infested soil was sealed for 48 hours after mixing, and tomatoes were planted, after the soil was aired out, as the indicator plant. If the nematodes survive the chemical treatment, they attack the roots and cause swellings or knots. No such damage to the tomatoes was noted four weeks after treatment and thus, trichloroacrylonitrile at 25 p.p.m. was successful in controlling nematodes.

*Example 4*

Trichloroacrylonitrile was also tested to see if it was active against soil-borne pathogenic fungi. Here, the compound under test was pipetted into *Rhizoctonia solani* and *Fusarium solani* infested soil at varying rates, mixed thoroughly, and then dumped into paper containers. Cotton seeds were then planted into this infested and treated soil. Three to four weeks later the plants were inspected for disease symptoms. The *Rhizoctonia solani* and the *Fusarium solani* infested soil did not cause injury to the cotton plants when they were treated with trichloroacrylonitrile at rates of 27 p.p.m. and 55 p.p.m. respectively.

*Example 5*

Three inch sections of glass columns were taped together to form one long glass column. This column then was filled with soil infested with *Fusarium solani*. The trichloroacrylonitrile under test was injected six inches below the top of the soil filled glass column, and was allowed several days to penetrate the soil. Following this period, the columns were dismantled and the soil from each labelled 3-inch section was poured into paper cups. Pinto beans were planted into these cups to offer any surviving fungus a chance to develop. By observing disease occurrence in the paper cups, the depth of penetration of the compound under test can be determined. Complete control of *Fusarium solani* was observed from the point of injection to the surface and down through 27 inches of soil.

We claim:
1. A method of controlling nematodes comprising applying a nematocidal amount of trichloroacrylonitrile to a nematode habitat.
2. A method of controlling fungi comprising applying a fungicidal amount of trichloroacrylonitrile to a fungi habitat.

References Cited in the file of this patent
UNITED STATES PATENTS
2,433,742    Davis ------------------ Dec. 30, 1947